US009197938B2

(12) United States Patent
Chane et al.

(10) Patent No.: US 9,197,938 B2
(45) Date of Patent: *Nov. 24, 2015

(54) CONTEXTUAL DISPLAY OF INFORMATION WITH AN INTERACTIVE USER INTERFACE FOR TELEVISION

(71) Applicant: TVWORKS, LLC, Philadelphia, PA (US)

(72) Inventors: Lena Chane, San Francisco, CA (US); Samuel Moreau, Mill Valley, CA (US); Darrell Haber, Martinez, CA (US); Matt Marenghi, San Francisco, CA (US)

(73) Assignee: TVWorks, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/167,355

(22) Filed: Jan. 29, 2014

(65) Prior Publication Data
US 2014/0150024 A1 May 29, 2014

Related U.S. Application Data

(63) Continuation of application No. 13/611,986, filed on Sep. 12, 2012, now Pat. No. 8,756,634, which is a continuation of application No. 10/618,210, filed on Jul. 11, 2003, now Pat. No. 8,352,983, and a
(Continued)

(51) Int. Cl.
*G06F 3/00* (2006.01)
*H04N 5/445* (2011.01)
(Continued)

(52) U.S. Cl.
CPC ......... *H04N 21/478* (2013.01); *H04N 5/44543* (2013.01); *H04N 21/26283* (2013.01);
(Continued)

(58) Field of Classification Search
CPC .......... H04N 21/478; H04N 21/26283; H04N 21/8133; H04N 21/4312; H04N 21/47217; H04N 21/8153; H04N 21/44543; H04N 21/482
USPC ........... 725/43, 42, 51, 61; 348/563, 564, 565
See application file for complete search history.

(56) References Cited

U.S. PATENT DOCUMENTS 5,287,489 A    2/1994  Nimmo et al.
5,321,750 A    6/1994  Nadan
(Continued)

FOREIGN PATENT DOCUMENTS

EP    0624039 A2    11/1994
EP    0963115 A1    12/1999
(Continued)

OTHER PUBLICATIONS

Boronat F et al: "Multimedia group and inter-stream synchronization techniques: A comparative study", Information Systems. Pergamon Press. Oxford. GB. vol. 34. No. 1. Mar. 1, 2009. pp. 108-131. XP025644936.
(Continued)

*Primary Examiner* — Hoang-Vu A Nguyen-Ba
(74) *Attorney, Agent, or Firm* — Banner & Witcoff, Ltd.

(57) ABSTRACT

A user interface for interactive television services is represented as a visual overlay that provides a viewer with knowledge of a library of available content relating to a currently tuned to television channel and navigation options for selecting desired portions of the available content from the library, the available content being designated according to business rules specified by a provider of the interactive television services. The visual overlay may be displayed over full-screen or embedded television programming, which may be broadcast television programming or on-demand television programming.

17 Claims, 5 Drawing Sheets

Channel Assistant with CNBC content

Channel Assistant with CNBC content (poll question)

Related U.S. Application Data continuation-in-part of application No. 10/390,064, filed on Mar. 14, 2003, now Pat. No. 8,042,132, and a continuation-in-part of application No. 10/460,950, filed on Jun. 12, 2003, now Pat. No. 8,707,354, and a continuation-in-part of application No. 10/247,901, filed on Sep. 19, 2002, now Pat. No. 8,365,230.

(60) Provisional application No. 60/395,277, filed on Jul. 11, 2002.

(51) Int. Cl.
| | |
|---|---|
| *H04N 21/478* | (2011.01) |
| *H04N 21/482* | (2011.01) |
| *H04N 21/431* | (2011.01) |
| *H04N 21/472* | (2011.01) |
| *H04N 21/81* | (2011.01) |
| *H04N 21/262* | (2011.01) |
| *H04N 5/45* | (2011.01) |

(52) U.S. Cl.
CPC ..... *H04N21/4312* (2013.01); *H04N 21/47217* (2013.01); *H04N 21/482* (2013.01); *H04N 21/8133* (2013.01); *H04N 21/8153* (2013.01); *H04N 5/45* (2013.01)

(56) References Cited

U.S. PATENT DOCUMENTS

| | | | |
|---|---|---|---|
| 5,353,121 A | 10/1994 | Young et al. | |
| 5,485,221 A | 1/1996 | Banker et al. | |
| 5,583,563 A | 12/1996 | Wanderscheid et al. | |
| 5,589,892 A * | 12/1996 | Knee et al. | 725/43 |
| 5,592,551 A | 1/1997 | Lett et al. | |
| 5,594,509 A | 1/1997 | Florin et al. | |
| 5,613,057 A | 3/1997 | Caravel | |
| 5,621,456 A | 4/1997 | Florin et al. | |
| 5,657,072 A | 8/1997 | Aristides et al. | |
| 5,659,793 A | 8/1997 | Escobar et al. | |
| 5,666,645 A | 9/1997 | Thomas et al. | |
| 5,675,752 A | 10/1997 | Scott et al. | |
| 5,694,176 A | 12/1997 | Bruette et al. | |
| 5,802,284 A | 9/1998 | Karlton et al. | |
| 5,826,102 A | 10/1998 | Escobar et al. | |
| 5,844,620 A | 12/1998 | Coleman et al. | |
| 5,850,218 A | 12/1998 | LaJoie et al. | |
| 5,852,435 A | 12/1998 | Vigneaux et al. | |
| 5,860,073 A | 1/1999 | Ferrel et al. | |
| 5,883,677 A | 3/1999 | Hofmann | |
| 5,892,902 A | 4/1999 | Clark | |
| 5,892,905 A | 4/1999 | Brandt et al. | |
| 5,905,492 A | 5/1999 | Straub et al. | |
| 5,929,849 A | 7/1999 | Kikinis | |
| 5,990,890 A | 11/1999 | Etheredge | |
| 5,996,025 A | 11/1999 | Day et al. | |
| 6,002,394 A | 12/1999 | Schein et al. | |
| 6,005,561 A | 12/1999 | Hawkins et al. | |
| 6,008,803 A | 12/1999 | Rowe et al. | |
| 6,008,836 A | 12/1999 | Bruck et al. | |
| 6,016,144 A | 1/2000 | Blonstein et al. | |
| 6,025,837 A | 2/2000 | Matthews, III et al. | |
| 6,049,823 A | 4/2000 | Hwang | |
| 6,061,695 A | 5/2000 | Slivka et al. | |
| 6,067,108 A | 5/2000 | Yokote et al. | |
| 6,088,722 A | 7/2000 | Herz et al. | |
| 6,091,411 A | 7/2000 | Straub et al. | |
| 6,094,237 A | 7/2000 | Hashimoto | |
| 6,141,003 A | 10/2000 | Chor et al. | |
| 6,148,081 A | 11/2000 | Szymanski et al. | |
| 6,162,697 A | 12/2000 | Singh et al. | |
| 6,169,543 B1 | 1/2001 | Wehmeyer | |
| 6,172,677 B1 | 1/2001 | Stautner et al. | |
| 6,177,931 B1 | 1/2001 | Alexander et al. | |
| 6,191,781 B1 | 2/2001 | Chaney et al. | |
| 6,195,692 B1 | 2/2001 | Hsu | |
| 6,205,582 B1 | 3/2001 | Hoarty | |
| 6,219,839 B1 | 4/2001 | Sampsell | |
| 6,239,795 B1 | 5/2001 | Ulrich et al. | |
| 6,240,555 B1 | 5/2001 | Shoff et al. | |
| 6,292,187 B1 | 9/2001 | Gibbs et al. | |
| 6,292,827 B1 | 9/2001 | Raz | |
| 6,295,057 B1 | 9/2001 | Rosin et al. | |
| 6,314,569 B1 | 11/2001 | Chernock et al. | |
| 6,317,885 B1 | 11/2001 | Fries | |
| 6,345,305 B1 | 2/2002 | Beck et al. | |
| 6,405,239 B1 | 6/2002 | Addington et al. | |
| 6,415,438 B1 | 7/2002 | Blackketter et al. | |
| 6,421,067 B1 | 7/2002 | Kamen et al. | |
| 6,426,779 B1 | 7/2002 | Noguchi et al. | |
| 6,442,755 B1 | 8/2002 | Lemmons et al. | |
| 6,477,705 B1 | 11/2002 | Yuen et al. | |
| 6,486,920 B2 | 11/2002 | Arai et al. | |
| 6,522,342 B1 | 2/2003 | Gagnon et al. | |
| 6,529,950 B1 | 3/2003 | Lumelsky et al. | |
| 6,532,589 B1 | 3/2003 | Proehl et al. | |
| 6,564,263 B1 | 5/2003 | Bergman et al. | |
| 6,567,104 B1 | 5/2003 | Andrew et al. | |
| 6,571,392 B1 | 5/2003 | Zigmond et al. | |
| 6,591,292 B1 | 7/2003 | Morrison et al. | |
| 6,621,509 B1 | 9/2003 | Eiref et al. | |
| 6,636,887 B1 | 10/2003 | Augeri | |
| 6,658,661 B1 | 12/2003 | Arsenault et al. | |
| 6,678,891 B1 | 1/2004 | Wilcox et al. | |
| 6,684,400 B1 | 1/2004 | Goode et al. | |
| 6,731,310 B2 | 5/2004 | Craycroft et al. | |
| 6,760,043 B2 | 7/2004 | Markel | |
| 6,763,522 B1 | 7/2004 | Kondo et al. | |
| 6,766,526 B1 | 7/2004 | Ellis | |
| 6,806,887 B2 | 10/2004 | Chernock et al. | |
| 6,857,128 B1 | 2/2005 | Borden, IV et al. | |
| 6,886,029 B1 | 4/2005 | Pecus et al. | |
| 6,910,191 B2 | 6/2005 | Segerberg et al. | |
| 6,918,131 B1 | 7/2005 | Rautila et al. | |
| 7,028,327 B1 | 4/2006 | Dougherty et al. | |
| 7,065,785 B1 | 6/2006 | Shaffer et al. | |
| 7,103,904 B1 | 9/2006 | Blackketter et al. | |
| 7,114,170 B2 | 9/2006 | Harris et al. | |
| 7,152,236 B1 | 12/2006 | Wugofski et al. | |
| 7,162,694 B2 | 1/2007 | Venolia | |
| 7,162,697 B2 | 1/2007 | Markel | |
| 7,197,715 B1 | 3/2007 | Valeria | |
| 7,207,057 B1 | 4/2007 | Rowe | |
| 7,213,005 B2 | 5/2007 | Mourad et | |
| 7,221,801 B2 | 5/2007 | Jang et al. | |
| 7,237,252 B2 | 6/2007 | Billmaier | |
| 7,305,696 B2 | 12/2007 | Thomas et al. | |
| 7,313,806 B1 | 12/2007 | Williams et al. | |
| 7,337,457 B2 | 2/2008 | Pack et al. | |
| 7,360,232 B2 | 4/2008 | Mitchell | |
| 7,363,612 B2 | 4/2008 | Satuloori et al. | |
| 7,406,705 B2 | 7/2008 | Crinon et al. | |
| 7,440,967 B2 | 10/2008 | Chidlovskii | |
| 7,464,344 B1 | 12/2008 | Carmichael et al. | |
| 7,516,468 B1 | 4/2009 | Deller et al. | |
| 7,523,180 B1 | 4/2009 | DeLuca et al. | |
| 7,587,415 B2 | 9/2009 | Gaurav et al. | |
| 7,624,416 B1 | 11/2009 | Vandermolen et al. | |
| 7,640,487 B2 | 12/2009 | Amielh-Caprioglio et al. | |
| 7,702,315 B2 | 4/2010 | Engstrom et al. | |
| 7,703,116 B1 | 4/2010 | Moreau et al. | |
| 7,721,307 B2 | 5/2010 | Hendricks et al. | |
| 7,743,330 B1 | 6/2010 | Hendricks et al. | |
| 7,752,258 B2 | 7/2010 | Lewin et al. | |
| 7,861,259 B2 | 12/2010 | Barone, Jr. | |
| 7,913,286 B2 | 3/2011 | Sarachik et al. | |
| 7,958,528 B2 | 6/2011 | Moreau et al. | |
| 8,266,652 B2 | 9/2012 | Roberts et al. | |
| 8,296,805 B2 | 10/2012 | Tabatabai et al. | |
| 8,365,230 B2 | 1/2013 | Chane et al. | |
| 8,381,259 B1 | 2/2013 | Khosla | |
| 8,448,208 B2 | 5/2013 | Moreau et al. | |
| 8,660,545 B1 | 2/2014 | Redford et al. | |
| 8,850,495 B2 | 9/2014 | Pan | |

(56) References Cited

U.S. PATENT DOCUMENTS

| | | |
|---|---|---|
| 8,863,196 B2 | 10/2014 | Patil et al. |
| 2001/0014206 A1 | 8/2001 | Artigalas et al. |
| 2001/0027563 A1 | 10/2001 | White et al. |
| 2001/0049823 A1 | 12/2001 | Matey |
| 2001/0056573 A1 | 12/2001 | Kovac et al. |
| 2001/0056577 A1 | 12/2001 | Gordon et al. |
| 2002/0010928 A1 | 1/2002 | Sahota |
| 2002/0016969 A1 | 2/2002 | Kimble |
| 2002/0023270 A1 | 2/2002 | Thomas et al. |
| 2002/0026642 A1 | 2/2002 | Augenbraun et al. |
| 2002/0041104 A1 | 4/2002 | Graf et al. |
| 2002/0042915 A1 | 4/2002 | Kubischta et al. |
| 2002/0059094 A1 | 5/2002 | Hosea et al. |
| 2002/0059586 A1 | 5/2002 | Carney et al. |
| 2002/0059629 A1 | 5/2002 | Markel |
| 2002/0067376 A1 | 6/2002 | Martin et al. |
| 2002/0069407 A1 | 6/2002 | Fagnani et al. |
| 2002/0070978 A1 | 6/2002 | Wishoff et al. |
| 2002/0078444 A1 | 6/2002 | Krewin et al. |
| 2002/0078449 A1 | 6/2002 | Gordon et al. |
| 2002/0083450 A1 | 6/2002 | Kamen et al. |
| 2002/0100041 A1 | 7/2002 | Rosenberg et al. |
| 2002/0107973 A1 | 8/2002 | Lennon et al. |
| 2002/0108122 A1 | 8/2002 | Alao et al. |
| 2002/0120609 A1 | 8/2002 | Lang et al. |
| 2002/0124254 A1 | 9/2002 | Kikinis |
| 2002/0144269 A1 | 10/2002 | Connelly |
| 2002/0144273 A1 | 10/2002 | Reto |
| 2002/0147645 A1 | 10/2002 | Alao et al. |
| 2002/0152477 A1 | 10/2002 | Goodman et al. |
| 2002/0156839 A1 | 10/2002 | Peterson et al. |
| 2002/0169885 A1 | 11/2002 | Alao et al. |
| 2002/0170059 A1 | 11/2002 | Hoang |
| 2002/0171691 A1 | 11/2002 | Currans et al. |
| 2002/0171940 A1 | 11/2002 | He et al. |
| 2002/0184629 A1 | 12/2002 | Sie et al. |
| 2002/0188944 A1 | 12/2002 | Noble |
| 2002/0196268 A1 | 12/2002 | Wolff et al. |
| 2002/0199190 A1 | 12/2002 | Su |
| 2003/0001880 A1 | 1/2003 | Holtz et al. |
| 2003/0005444 A1 | 1/2003 | Crinon et al. |
| 2003/0005453 A1 | 1/2003 | Rodriguez et al. |
| 2003/0014752 A1 | 1/2003 | Zaslavsky et al. |
| 2003/0014753 A1 | 1/2003 | Beach et al. |
| 2003/0018755 A1 | 1/2003 | Masterson et al. |
| 2003/0023970 A1 | 1/2003 | Panabaker |
| 2003/0025832 A1 | 2/2003 | Swart et al. |
| 2003/0028873 A1 | 2/2003 | Lemmons |
| 2003/0041104 A1 | 2/2003 | Wingard et al. |
| 2003/0051246 A1 | 3/2003 | Wilder et al. |
| 2003/0056216 A1 | 3/2003 | Wugofski et al. |
| 2003/0056218 A1 | 3/2003 | Wingard et al. |
| 2003/0058948 A1 | 3/2003 | Kelly et al. |
| 2003/0066081 A1 | 4/2003 | Barone et al. |
| 2003/0067554 A1 | 4/2003 | Klarfeld et al. |
| 2003/0070170 A1 | 4/2003 | Lennon |
| 2003/0079226 A1 | 4/2003 | Barrett |
| 2003/0084443 A1 | 5/2003 | Laughlin et al. |
| 2003/0084444 A1 | 5/2003 | Ullman et al. |
| 2003/0084449 A1 | 5/2003 | Chane et al. |
| 2003/0086694 A1 | 5/2003 | Davidsson |
| 2003/0093790 A1 | 5/2003 | Logan et al. |
| 2003/0093792 A1 | 5/2003 | Labeeb et al. |
| 2003/0097657 A1 | 5/2003 | Zhou et al. |
| 2003/0110500 A1 | 6/2003 | Rodriguez |
| 2003/0110503 A1 | 6/2003 | Perkes |
| 2003/0115219 A1 | 6/2003 | Chadwick |
| 2003/0115612 A1 | 6/2003 | Mao et al. |
| 2003/0126601 A1 | 7/2003 | Roberts et al. |
| 2003/0132971 A1 | 7/2003 | Billmaier et al. |
| 2003/0135464 A1 | 7/2003 | Mourad et al. |
| 2003/0140097 A1 | 7/2003 | Schloer |
| 2003/0151621 A1 | 8/2003 | McEvilly et al. |
| 2003/0158777 A1 | 8/2003 | Schiff et al. |
| 2003/0172370 A1 | 9/2003 | Satuloori et al. |
| 2003/0182663 A1 | 9/2003 | Gudorf et al. |
| 2003/0189668 A1 | 10/2003 | Newnam et al. |
| 2003/0204814 A1 | 10/2003 | Elo et al. |
| 2003/0204846 A1 | 10/2003 | Breen et al. |
| 2003/0204854 A1 | 10/2003 | Blackketter et al. |
| 2003/0226141 A1 | 12/2003 | Krasnow et al. |
| 2003/0229899 A1 | 12/2003 | Thompson et al. |
| 2004/0003402 A1 | 1/2004 | McKenna |
| 2004/0019900 A1 | 1/2004 | Knightbridge et al. |
| 2004/0019908 A1 | 1/2004 | Williams et al. |
| 2004/0031015 A1 | 2/2004 | Ben-Romdhane et al. |
| 2004/0039754 A1 | 2/2004 | Harple |
| 2004/0078814 A1 | 4/2004 | Allen |
| 2004/0107437 A1 | 6/2004 | Reichardt et al. |
| 2004/0107439 A1 | 6/2004 | Hassell et al. |
| 2004/0128699 A1 | 7/2004 | Delpuch et al. |
| 2004/0133923 A1 | 7/2004 | Watson et al. |
| 2004/0136698 A1 | 7/2004 | Mock |
| 2004/0172648 A1 | 9/2004 | Xu et al. |
| 2004/0194136 A1 | 9/2004 | Finseth et al. |
| 2004/0199578 A1 | 10/2004 | Kapczynski et al. |
| 2004/0221306 A1 | 11/2004 | Noh |
| 2004/0226051 A1 | 11/2004 | Carney et al. |
| 2005/0005288 A1 | 1/2005 | Novak |
| 2005/0015796 A1 | 1/2005 | Bruckner et al. |
| 2005/0015804 A1 | 1/2005 | LaJoie et al. |
| 2005/0028208 A1 | 2/2005 | Ellis et al. |
| 2005/0086172 A1 | 4/2005 | Stefik |
| 2005/0149972 A1 | 7/2005 | Knudson |
| 2005/0155063 A1 | 7/2005 | Bayrakeri et al. |
| 2005/0262542 A1 | 11/2005 | DeWeese et al. |
| 2005/0283800 A1* | 12/2005 | Ellis et al. .............. 725/40 |
| 2005/0287948 A1 | 12/2005 | Hellwagner et al. |
| 2006/0004743 A1 | 1/2006 | Murao et al. |
| 2006/0059525 A1 | 3/2006 | Jerding et al. |
| 2006/0080707 A1 | 4/2006 | Laksono |
| 2006/0105793 A1 | 5/2006 | Gutowski et al. |
| 2006/0156336 A1* | 7/2006 | Knudson et al. .............. 725/39 |
| 2006/0195865 A1 | 8/2006 | Fablet |
| 2006/0200842 A1 | 9/2006 | Chapman et al. |
| 2006/0206912 A1 | 9/2006 | Klarfeld et al. |
| 2006/0248572 A1 | 11/2006 | Kitsukama et al. |
| 2007/0112761 A1 | 5/2007 | Xu et al. |
| 2007/0271587 A1 | 11/2007 | Rowe |
| 2008/0037722 A1 | 2/2008 | Klassen |
| 2008/0060011 A1 | 3/2008 | Kelts |
| 2008/0189740 A1 | 8/2008 | Carpenter et al. |
| 2008/0196070 A1 | 8/2008 | White et al. |
| 2008/0235725 A1 | 9/2008 | Hendricks |
| 2008/0276278 A1 | 11/2008 | Krieger et al. |
| 2008/0288644 A1 | 11/2008 | Gilfix et al. |
| 2008/0317233 A1 | 12/2008 | Rey et al. |
| 2009/0019485 A1* | 1/2009 | Ellis et al. .............. 725/40 |
| 2009/0024629 A1 | 1/2009 | Miyauchi |
| 2009/0094632 A1 | 4/2009 | Newnam et al. |
| 2009/0164904 A1 | 6/2009 | Horowitz et al. |
| 2009/0222872 A1 | 9/2009 | Schlack |
| 2009/0228441 A1 | 9/2009 | Sandvik |
| 2009/0271829 A1 | 10/2009 | Larsson et al. |
| 2009/0292548 A1 | 11/2009 | Van Court |
| 2010/0077057 A1 | 3/2010 | Godin et al. |
| 2010/0175084 A1 | 7/2010 | Ellis et al. |
| 2010/0180300 A1 | 7/2010 | Carpenter et al. |
| 2010/0223640 A1 | 9/2010 | Reichardt et al. |
| 2010/0250190 A1 | 9/2010 | Zhang et al. |
| 2010/0251284 A1* | 9/2010 | Ellis et al. .............. 725/28 |
| 2011/0055282 A1 | 3/2011 | Hoving |
| 2011/0058101 A1 | 3/2011 | Earley et al. |
| 2011/0087348 A1 | 4/2011 | Wong |
| 2011/0093909 A1 | 4/2011 | Roberts et al. |
| 2011/0209180 A1* | 8/2011 | Ellis et al. .............. 725/42 |
| 2011/0214143 A1 | 9/2011 | Rits et al. |
| 2011/0219419 A1 | 9/2011 | Reisman |
| 2011/0246495 A1 | 10/2011 | Mallinson |
| 2011/0247042 A1 | 10/2011 | Mallinson |
| 2012/0002111 A1 | 1/2012 | Sandoval et al. |
| 2012/0054811 A1 | 3/2012 | Spears |
| 2012/0117151 A1 | 5/2012 | Bill |
| 2012/0227073 A1 | 9/2012 | Hosein et al. |

(56) References Cited

U.S. PATENT DOCUMENTS

| | | | |
|---|---|---|---|
| 2012/0324002 | A1 | 12/2012 | Chen |
| 2012/0324518 | A1 | 12/2012 | Thomas et al. |
| 2013/0111514 | A1 | 5/2013 | Slavin et al. |
| 2013/0262997 | A1 | 10/2013 | Markworth et al. |
| 2013/0298038 | A1 | 11/2013 | Spivack et al. |
| 2013/0326570 | A1 | 12/2013 | Cowper et al. |
| 2013/0332839 | A1 | 12/2013 | Frazier et al. |
| 2013/0332852 | A1 | 12/2013 | Castanho et al. |
| 2013/0347018 | A1 | 12/2013 | Limp et al. |
| 2014/0009680 | A1 | 1/2014 | Moon et al. |
| 2014/0149918 | A1 | 5/2014 | Asokan et al. |
| 2014/0150022 | A1 | 5/2014 | Oh et al. |
| 2014/0365302 | A1 | 12/2014 | Walker |

FOREIGN PATENT DOCUMENTS

| | | | |
|---|---|---|---|
| EP | 1058999 | A1 | 12/2000 |
| EP | 1080582 | A1 | 3/2001 |
| GB | 2323489 | A | 9/1998 |
| WO | 9963757 | A1 | 12/1999 |
| WO | 0011869 | A1 | 3/2000 |
| WO | 0033576 | A1 | 6/2000 |
| WO | 0110115 | A1 | 2/2001 |
| WO | 0182613 | A1 | 11/2001 |
| WO | 02063426 | A2 | 8/2002 |
| WO | 02063471 | A2 | 8/2002 |
| WO | 02063851 | A2 | 8/2002 |
| WO | 02063878 | A2 | 8/2002 |
| WO | 03009126 | A1 | 1/2003 |
| WO | 03/026275 | A2 | 3/2003 |
| WO | 2011/053271 | A1 | 5/2011 |
| WO | 2012/094105 | A1 | 7/2012 |
| WO | 2012/154541 | A1 | 11/2012 |

OTHER PUBLICATIONS

Extended European Search Report—EP14159227.9—Mailing Date: Sep. 3, 2014.
U.S. Appl. No. 10/672,983, filed Sep. 25, 2003, System and method for controlling iTV application behaviors through the use of application profile filters.
U.S. Appl. No. 10/306,752, filed Nov. 27, 2002, Broadcast database.
U.S. Appl. No. 10/635,799, filed Aug. 5, 2003, User customization of user interfaces for interactive television.
U.S. Appl. No. 10/925,737, filed Aug. 24, 2004, Contextual navigational control for digital television.
U.S. Appl. No. 10/460,950, filed Jun. 12, 2003, Graphically rich, modular, promotional tile interface for interactive television.
U.S. Appl. No. 12/877,492, filed Sep. 8, 2010, Verification of Semantic Constraints in Multimedia Data and in its Announcement, Signaling and Interchange.
U.S. Appl. No. 13/049,948, filed Mar. 17, 2011, System and Method for Construction, Delivery and Display of ITV Applications That Blend Programming Information of On-Demand and Broadcast Service Offerings.
U.S. Appl. No. 13/161,879, filed Jun. 16, 2011, System and Method for Construction, Delivery and Display of iTV Content.
U.S. Appl. No. 13/484,425, filed May 31, 2012, System and Method for Preferred Placement Programming of iTV Content.
U.S. Appl. No. 13/490,932, filed Jun. 7, 2012, System and Method for Construction, Delivery and Display of iTV Content.
U.S. Appl. No. 13/611,986, filed Sep. 12, 2012, Programming Contextual Interactive User Interface for Television.
U.S. Appl. No. 13/736,283, filed Jan. 8, 2013, Interactive User Interface for Television Applications.
U.S. Appl. No. 13/771,592, filed Feb. 20, 2013, System and Method for Construction, Delivery and Display of iTV Content.
U.S. Appl. No. 13/751,441, filed Jan. 28, 2013, Interactive User Interface for Television Applications.
U.S. Appl. No. 13/795,792, filed Mar. 12, 2013, Channel Family Surf Control.
U.S. Appl. No. 13/803,274, filed Mar. 14, 2013, Providing Supplemental Content.
U.S. Appl. No. 13/153,675, filed Jun. 6, 2011, Asynchronous Interaction at Specific Points in Content.
U.S. Appl. No. 10/618,210, filed Jul. 11, 2003, Programming Contextual Interactive User Interface for Television.
U.S. Appl. No. 10/933,845, filed Sep. 2, 2004, System and Method for Preferred Placement Programming of ITV Content.
U.S. Appl. No. 11/253,892, filed Oct. 18, 2005, Optimized Application On-The-Wire Format for Contruction, Delivery and Display of Enhanced Television Content.
U.S. Appl. No. 11/381,508, filed May 3, 2006, Verification of Semantic Contraints in Multimedia Data and in its Announcement, Signaling and Interchange.
U.S. Appl. No. 10/664,275, filed Sep. 16, 2003, System and Method for Construction, Delivery and Display of ITV Applications That Blend Programming Information of on Demand and Broadcast Service Offerings.
U.S. Appl. No. 12/730,771, filed Mar. 24, 2010, System and Method for Construction, Delivery and Display of ITV Applications That Blend Programming Information of On-Demand and Broadcast Service Offerings.
U.S. Appl. No. 10/247,901, filed Sep. 19, 2002, Interactive User Interface for Television Applications.
U.S. Appl. No. 10/630,815, filed Jul. 29, 2003, System and Method for Construction, Delivery and Display of ITV Content.
U.S. Appl. No. 10/390,064, filed Mar. 14, 2003, System and Method for Construction, Delivery and Display of ITV Content.
U.S. Appl. No. 10/894,740, filed Jul. 19, 2004, Channel Family Surf Control.
U.S. Appl. No. 13/860,146, filed Apr. 4, 2013, System and Method for Construction, Delivery and Display of ITV Applications That Blend Programming Information of On-Demand and Broadcast Service Offerings.
U.S. Appl. No. 14/039,734, filed Sep. 27, 2013, System and Method for Controlling ITV Application Behaviors Through the Use of Application Profile Filters.
U.S. Appl. No. 14/013,290, filed Aug. 29, 2013, Graphically Rich, Modular, Promotional Tile Interface for Interactive Television.
Fernando Pereira, "The MPEG-4 Book", Prentice Hall, Jul. 10, 2002.
Michael Adams, "Open Cable Architecture", Cisco Press, Dec. 3, 1999.
Andreas Kraft and Klaus Hofrichter, "An Approach for Script-Based Broadcast Application Production", Springer-Verlag Brling Heidelberg, pp. 74-82, 1999.
Mark Riehl, "XML and Perl", Sams, Oct. 16, 2002.
MetaTV, Inc., PCT/US02/29917 filed Sep. 19, 2002, International Search Report dated Apr. 14, 2003; ISA/US; 6 pages.
Sylvain Devillers, "Bitstream Syntax Definition Language: an Input to MPEG-21 Content Representation", Mar. 2001, ISO, ISO/IEC JTC/SC29/WG11 MPEG01/M7053.
Shim, et al., "A SMIL Based Graphical Interface for Interactive TV", Internet Tech. Laboratory Dept. of Comp. Engineering, San Jose State University, pp. 257-266, 2003.
Watchwith webpage; http://www.watchwith.com/content_owners/watchwith_plalform_components.jsp (last visited Mar. 12, 2013).
Matt Duffy; TVplus App reveals content click-through rates north of 10% across sync enabled programming; http://www.tvplus.com/blog/TVplus-App-reveals-content-click-through-rates-north-of-10-Percent-across-sync-enabled-programming (retrieved from the Wayback Machine on Mar. 12, 2013).
"In Time for Academy Awards Telecast, Companion TV App Umami Debuts First Real-Time Sharing of a TV Program's Images"; Umami News; http:www.umami.tv/2012-02-23.html (retrieved from the Wayback Machine on Mar. 12, 2013).
Canadian Office Action—CA 2,685,833—Dated Jan. 22, 2015.
Yoon, et al., "Video Gadget: MPET-7 Based Audio-Visual Content Indexing and Browsing Engine", LG Electronics Institute of Technology, 2001, pp. 59-68.
European Extended Search Report—EP 13192112.4—Dated May 11, 2015.
CA Response to Office Action—CA Appl. 2,685,833—Submitted Jul. 17, 2015.

* cited by examiner

TV Assistant (non-Channel Assistant enable)

Channel Assistant with ESPN content

Channel Assistant with CNBC content

Channel Assistant with CNBC content (poll question)

Channel Assistant with CNBC
content (poll results)

Channel Assistant (basic form)

Channel Assistant with broadcaster content

CONTEXTUAL DISPLAY OF INFORMATION WITH AN INTERACTIVE USER INTERFACE FOR TELEVISION

RELATED APPLICATIONS

The present application is a continuation of and claims priority to U.S. application Ser. No. 13/611,986, filed Sep. 12, 2012, which is a continuation of and claims priority to U.S. application Ser. No. 10/618,210, filed Jul. 11, 2003, and titled "Programming Contextual Interactive User Interface for Television", which in turn is related to and claims priority to U.S. provisional application number 60/395,277, filed Jul. 11, 2002, and is a continuation-in-part of the following applications:

1. U.S. patent application Ser. No. 10/247,901, filed Sep. 19, 2002, and titled "Interactive User Interface for Television Applications";
2. U.S. patent application Ser. No. 10/390,064 (now U.S. Pat. No. 8,042,132), filed Mar. 14, 2003, and titled "System and Method for Construction, Delivery and Display of iTV"; and
3. U.S. patent application Ser. No. 10/460,950, filed Jun. 12, 2003, and titled "Graphically Rich, Modular, Promotional Title Interface for Interactive Television."

Each of the above mentioned patent applications is hereby incorporated by reference in its entirety. Additionally, each of the following applications is also incorporated by reference in its entirety:

1. U.S. provisional patent application No. 60/323,658, filed Sep. 19, 2001, and titled "Interactive User Interface for Television Applications";
2. U.S. provisional patent application No. 60/364,545, filed Mar. 15, 2002, and titled "iTV Application Client"; and
3. U.S. provisional patent application No. 60/388,493, filed Jun. 12, 2002, and titled "Graphically Rich, Modular, Promotional Tile Interface for Interactive Television."

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to user interfaces for interactive television (iTV), which in one embodiment serve as a set of information presentation architectures for enabling users of iTV services to access a range of broadcast and on-demand programming content related to a current broadcast and channel context of the television viewer, and offered through an iTV network, and made available via applications that may execute on a set-top box.

BACKGROUND

In the past few years, home entertainment has evolved from purely one-way radio and television broadcasts to include two-way communication that encompasses interactive games, video on demand (VOD), educational fare and consumer-oriented services (e.g., interactive shopping). For the most part, these services have been offered through familiar cable and satellite television distribution systems.

Broadly speaking, there are two paradigms for using cable and satellite systems in this fashion. One is computer-centric: using an installed satellite or cable feed (perhaps with a cable or telephone network back channel) as a high-bandwidth conduit to bring on-line computing services, such as Internet access, into the home. The second is television-centric: adding interactive functions to television programming.

In general, systems deployed using the television-centric model have been grouped under the label "interactive television" or iTV. iTV is generally understood as the convergence of Internet-like interactivity and traditional television programming and delivery technology. Making television interactive involves the addition of responsive, user-controlled elements to traditional broadcast video and audio signals. By adding a computer like device (usually referred to as a set-top box) to the television set and providing a communication path back to the service provider (the back channel), the viewer can be invited to interact with the programming, exert some level of control over the experience and to provide feedback.

iTV services are usually delivered to subscribers' homes through an existing cable or satellite system, along with other free and pay-for content (e.g., movies, games, news, images, audio programming, etc.). This content is generally delivered to the television via a set-top box, and users may navigate the offered services using a remote control and on-screen navigation system or menu. The set-top box is an addressable communications unit needed to decode signals as they arrive at the television. Depending on the system used it may also need to perform functions such as the decompression of the digital signal, or the handling of communications across the back channel. Together with a (typically handheld) remote control and on-screen menu, this unit provides an interface for users to find their way through the myriad of content and services offered and communicated to their television sets by the iTV system provider.

To illustrate, consider the case of a user ordering a pay-per-view movie. Using a remote control the user can select the desired service via the on-screen menu displayed on his or her television set. This request is sent via the back channel to the service provider's control system, which locates the required content and delivers it via a cable or satellite transmission system to the set-top box for decoding and display on the user's television. Along the way, a subscriber management system may be informed of the user's selection so that the user's account can be updated to reflect any relevant charges for the selected movie.

The on-screen menu may or may not be overlaid on top of the television picture. Common examples of on-screen menus include electronic program guides (EPGs), electronic catalogs, and advertising information. Television program guides have matured rapidly in recent years. At one time the only TV program guides available were those printed in newspapers and magazines. These guides typically had a grid with list of channels, showing the programming for those channels as a function of time. They also sometimes contained synopses of movies or television shows scheduled to be aired.

The advent of cable television systems brought on-screen EPGs. The early versions consisted of a dedicated channel displaying a program guide that showed the current (and perhaps limited future) programming for most or all channels. Since there is only space to show half a dozen or so channels on the screen at a time, the display would automatically scroll through all the available channels.

Today, however, many cable companies utilize set-top boxes to provide interactive EPGs that support advanced features such as the ability to call up a program guide grid at any time, and scroll through channels and programming forward and backward in time via a remote control. Usually information on programming for some days into the future is made available. In addition, modern EPGs can display lists of channel numbers, program titles and even program durations, appearing briefly each time the channel is changed, and at other times by selecting a corresponding option on the remote control. Textual descriptions of any program listed in the program grid, or of the current program being viewed, can be called up by using the remote control, and a user can change channels automatically by clicking on a program title as it is displayed in the program grid.

In addition to EPGs, popular iTV offerings include:

A. TV Portals. Influenced no doubt by the analogy to popular Internet "portals" such as AOL and YAHOO, many think of a television (TV) portal as a non-video, non-broadcast, "Internet-like" page on TV. Contrary to this popular opinion, however, a TV portal is actually an application "window" into the world of interactivity that links various forms of services, including walled gardens (also known as managed content) that may contain video, text and image assets, delivered via both broadcast and narrowcast, virtual channels, interactive program guides (IPGs), enhanced TV broadcasts, video on demand (VOD) content and more. In fact, many interactive experiences can originate from the TV portal or users come into the TV portal for additional content and services. Thus, the portal may be accessed through a navigation overlay on top of regular broadcasts or through an IPG, virtual channel or enhanced programming.

Network operators, programmers and content producers have an opportunity to custom brand the content areas of TV portals, providing them with a foundation for offering interactive services and enabling new revenue streams. A portal can contain a controlled set of valuable, aggregated content and merchant sites accessible by consumers. Portal participants can consist of e-commerce providers, such as home shopping, home banking and brokerage services; various news services; weather and sports information providers; as well as advertisers, TV programmers and other content producers.

Managed content designed for a TV environment can be linked to the TV portal, forming an interactive experience that combines the convenient, audio-visually entertaining medium of TV with the immediate information access and electronic purchasing powers often seen on the Internet. The portal offers a secure environment with a common TV-centric user interface, personalization capabilities and cross-merchant shopping capabilities. Some of the key components of portal content include:

i. Basic Personalized Information—Basic on-demand information services available to end users (subscribers) are based on their preferences and/or profile, including headline news, sports news and scores, local weather, horoscopes, business news and stock quotes.

ii. Branded Content—Information services in various categories include branded sources such as television networks, which may provide information and entertainment services in portals to augment their regular TV programming.

iii. Shopping—"T-commerce" or "TV Commerce" includes categories such as books, video, music, gifts, electronics, apparel, travel and toys, as well as advanced shopping features such as comparison shopping, cross-merchant shopping carts and auctions.

iv. Advertising—Advertising opportunities are widely available throughout the iTV landscape. Unlike Internet portals, which only provide targeted and personalized banner ads, broadband access and the rich medium of TV provide a compelling advertising vehicle, drawing consumers into a TV-centric entertainment experience that drives responses while providing the same targeting and personalization capabilities of the Internet.

v. Self-provisioning—Through a network operator's TV portal, subscribers can manage their own billing information and preferences, and subscribe to new services including premium services, e-mail, games, video on demand and more.

vi. Virtual Channels—A virtual channel is a custom-branded TV channel that can be accessed from programming, the main menu or info bar, from a network operator portal, an IPG or by manually selecting a specified channel number (e.g., channel 401). Within such a channel, a TV network, advertiser or content provider can combine a video library with Internet or database content, and on-demand features enable viewers to control their interactions with the information. Thus, virtual channels allow for specific content opportunities for niche audiences, targeted advertising, brand building, and program promotions, as well commerce and subscription revenue streams.

B. Interactive Program Guides (IPGs). The IPG is the navigation tool for TV viewing, allowing viewers to easily search for programming by time, channel, program type, and so on. It is an essential tool for iTV users, especially as the number of channels and other offerings increase. IPGs provide an opportunity for companies to offer an increasingly large amount of data in an easy-to-use interface.

C. Personal Video Recorders (PVRs). PVRs store video programming on an internal hard drive and function like a personalized video server, allowing end-users to "time shift" their TV viewing. While watching live TV, the user can "pause" and "rewind", as well as "fast-forward" to catch up to the live broadcast. PVRs also act as autonomous agents, searching all of the available programming and building a dynamic menu of personalized content choices that the user can access at his/her convenience. Currently most PVRs are stand-alone units, developed and marketed by companies such as TIVO and REPLAY NETWORKS (now SONICBLUE).

D. Video On Demand (VOD) Services. VOD is essentially server-side time shifting (vs. client-side in the case of PVRs). Users are able to play, pause and rewind videos on their TVs via their remote control. Companies such as CONCURRENT, DIVA, SEACHANGE and NCUBE provide VOD server technology.

E. Enhanced TV Broadcasts. Enhanced TV broadcasting provides interactive content linked to video programming. A user can request information on products within ads, access additional program information, such as sports statistics, or otherwise interact with a television broadcast such as a game show. This functionality is achieved through the transmission of an interactive trigger and data sent in the broadcast channel or other mechanism along with the video broadcast. For example, ATVEF (the Advanced Television Enhancement Forum) triggers are messages that arrive at a specific point in time during a broadcast (e.g., via text channel 2 of the closed caption channel carried on line 21 of NTSC video), and are intended to activate specific enhanced content.

Enhanced TV broadcasts can be combined with other services within a unified TV portal, integrating with a walled garden or virtual channel content to leverage robust order processing, fulfillment infrastructure and revenue sharing agreements that may already in place.

F. Other Services. E-mail access, chat functions, music jukeboxes and photo albums are examples of other iTV offerings.

Many of the applications listed above will be presented to end users via a common user interface and order/transaction entry and tracking system. However, each application has specific integration, management and distribution issues that arise depending on the environment that the network operators choose to deploy and significant problems are experienced by application providers and distributors in deploying and managing their iTV applications as a result. Stated differently, application providers and distributors face problems in developing and managing their iTV applications because there exists a proliferation of technologies and standards for the delivery of iTV applications and different network operators have chosen to deploy different combinations of these technologies. Content providers and application developers must navigate through this maze of often incompatible and unique combinations of the equipment, technologies and standards, and often must develop a unique and different application for each such combination that they wish to target. For their part, network operators must deploy, configure, manage and operate iTV applications on each different network configuration individually, increasing cost, complexity, and staffing needs, while reducing the number of service that can be deployed, and the quality of those services.

SUMMARY OF THE INVENTION

In one embodiment, a user interface for interactive television services is represented as a visual overlay that provides a viewer with knowledge of a library of available content relating to a currently tuned to television channel and navigation options for selecting desired portions of the available content from the library, the available content being designated according to business rules specified by a provider of the interactive television services. The visual overlay may be displayed over full-screen or embedded television programming, which may be broadcast television programming or on-demand television programming. The business rules may be based on one or more of: time of day, channel, current broadcast content, current on-demand content, preferred placement of content, viewer demographic information, viewer behavior, navigation context, and current content category.

In some cases, the visual overlay may include a grouping of tiles for displaying options within the library of available content. Placement and content of the tiles within the visual overlay depends upon the business rules, and the content of the tiles may include one or more of: channel logos, specific program logos or brands, including images, and images of people and things.

BRIEF DESCRIPTION OF THE DRAWINGS

The present invention is illustrated by way of example, and not limitation, in the figures of the accompanying drawings, in which.

DETAILED DESCRIPTION

Figure 1:
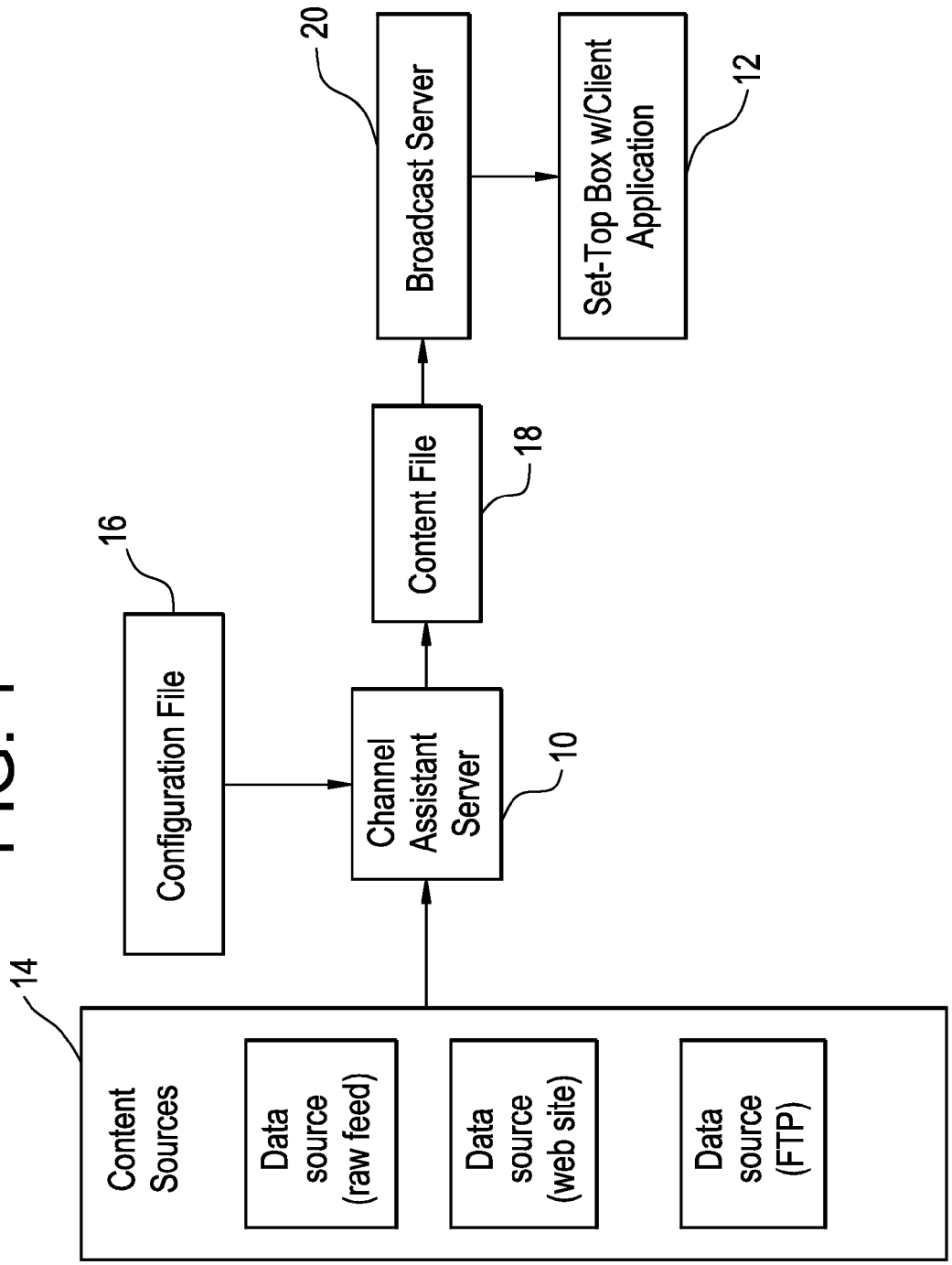
FIG. 1 illustrates an example of an iTV network suitable for distribution of user interface applications configured in accordance with the present invention.

In one embodiment, the present invention provides an improved user interface and user experience for accessing and navigating to iTV content, services and other applications that are related to an iTV channel. The user interface may be embodied as a television application that provides navigation, information and communication services together, over full-screen television or embedded/scaled television programming. The application serves as a user interface for iTV services and content related to a broadcast channel and may be accessed through operation of a remote control device associated with a set-top box or similar unit (which may, in some cases, be incorporated into a television set, a PVR or other multi-function unit). The present invention also provides a unique scheme by which, in one embodiment, network operators, programmers and broadcasters can easily deploy and make accessible to iTV subscribers a library of available content in an easy-to-use manner that combines current broadcast content with other services related to the broadcast channel in a smooth way that can blur the distinction between the current broadcast and related broadcaster assets, if the viewer so chooses.

The above-referenced provisional patent application 60/388,493, entitled "Graphically Rich, Modular, Promotional Tile Interface for Interactive Television", and its utility application counterpart, generally described (1) user interface methods to combine broadcast programming and on-demand content in a smooth way that provides a very subtle transition to related on-demand or broadcast content; (2) user interface methods wherein the viewer is presented different content selections based on the current programming content, to enhance the current programming and extend the content bandwidth; and (3) tiled user interfaces wherein business rules can be based on (3a) time of day, (3b) channel, (3c) current broadcast content. Further, the above-referenced provisional patent application 60/323,658, and its utility application counterpart Ser. No. 10/247,901, described generally a user interface application that may be embodied as a television application to provide navigation, information and communication services together, over full-screen television or embedded/scaled or pre-produced to scale television programming. The present invention combines these two concepts and elucidates, as embodied through several user interface examples, how information and on-demand services related to the current broadcast or on-demand programming and channel context can be made available to the television viewer.

The present user interface is termed herein a "Channel Assistant" and may be regarded as an application that leverages the Application Client and Application Server described in U.S. Provisional Patent Application 60/364,545 and U.S. patent application Ser. No. 10/390,064 to provide programming-specific textual, graphical and video related content. The Channel Assistant can work in conjunction with, or independently of the TV Assistant described in U.S. Provisional Patent Application 60/323,658 and U.S. patent application Ser. No. 10/247,901. More specifically, the Channel Assistant is an interactive application that provides a mechanism for presenting related text, graphics and video, scheduled and/or on-demand, to particular video programming, scheduled and/ or on-demand. The Channel Assistant application is presented with an intuitive, compelling visual interface over video programming.

The Channel Assistant operates in a client-server environment in which the Channel Assistant is the client. The architecture of this environment is described in detail in the above-cited patent applications; however, a brief review is presented herein in order to provide readers with sufficient background to understand the remaining discussion of the Channel Assistant. Referring then to FIG. 1, the server-side component (labeled Channel Assistant Server 10) is responsible for delivering data to the client application (Channel Assistant) resident at set-top box 12. Data delivery mechanisms may include, but are not limited to, one or more of the following: Internet Protocol (IP) messages, such as through in-band or out-of-band data pathways, or though an IP gateway product; or in-band or out-of-band carousel data. Such data may also be encapsulated within MPEG 2 packets for transmission through the in-band broadcast system.

The server 10 extracts, collects, integrates, and deploys content and, optionally, commerce from a variety of sources 14 such as web servers, raw television feeds, and data sources (such as file servers, etc.) into rich television-centric services. It thus allows existing Internet brands, content, and commerce services to be introduced to a new audience of viewers. Content is dynamically harvested, re-purposed and enriched for the television without affecting the existing technology infrastructure or publishing resources of the content provider.

As shown, content from the various sources 14 is retrieved by the Channel Assistant server 10 (one example of a server suitable for this purpose is described in detail in U.S. patent application Ser. No. 09/841,017, entitled "METHOD AND SYSTEM FOR TRANSFORMING CONTENT FOR EXECUTION ON MULTIPLE PLATFORMS", filed Apr. 23, 2001 and assigned to the assignee of the present invention, the complete disclosure of which is hereby incorporated by reference) and formatted according to instructions provided via a configuration file 16. This configuration file 16 (which can specify "business rules" for content collection, update, etc.) is created by the network or content service provider and is used to create the selected contents and the delivery location of a Contents file 18, which is the data file that contains the content to be displayed in the Channel Assistant. The configuration file 16 thus allows the operator of a given head-end, through a web interface or other command interface, to specify information regarding content such as location, syndication sources, number of items displayed per source, etc. It also allows the operator to indicate where the Contents file 18 is to be deployed.

The Contents file 18 is uploaded to an appropriate broadcast file server (BFS) 20 (e.g., using HTTP POSTs on a scheduled basis), which is responsible for delivering the Contents file 18 to the client-side application using the selected delivery mechanism (e.g., TCP/IP over an existing signaling channel or via a data carousel channel, etc.). The Channel Assistant server 10 thus creates a Contents file 18 for distribution to a set-top box 12 via a network operator's existing content delivery platform.

After receiving the Contents file 18, the client application (Channel Assistant) associated with set-top box 12 is responsible for reading the file and displaying the corresponding content. The Channel Assistant client application may be implemented in any of several ways, for example as a stand-alone application (e.g., written in a programming language such as JAVA or C for a given iTV system), or described in XML as enabled by the Application Client appropriate to a given iTV system. Further, the client-side component may be provided to the set-top box 12 in any of several ways depending on the set-top platform being used. For example, the client application may be flashed onto the set-top box 12 as a stand-alone application or as an extension or customization) of some set-top box resident application, or TV middleware system; or as a broadcast application that is carouseled to the set-top box 12 over an in-band or out-of-band data channel from the broadcast server 20.

Regardless of the transport method, the client application instantiates itself in the set-top box 12 and thereafter specifies the user interface menu's on-screen size and location. This allows the menu to be positioned in a specific region of the TV screen, for example as specified by x-y coordinates. Upon receipt of the Contents file 18, the client application reads the data contained in that file to populate the user interface.

The Channel Assistant may be activated in multiple ways; for example:
  1. As a user tunes to/views a particular broadcast/scheduled television channel the user is presented with either a) a visual cue that the channel offers additional, related content; or b) the related text, graphic or video link.
  2. As a user accesses/views a particular piece of on-demand programming the user is presented with either a) a visual cue that the channel offers additional, related content; or b) the related text, graphic or video link.

Further, the Channel Assistant has knowledge of the television channel lineup as well as the appropriate system on-demand listings information. As such, the Channel Assistant application may detect the channel/on-demand content and will receive the appropriate data and layout instructions from the server.

The following scenarios exemplify the behavior of one implementation of the Channel Assistant user interfaces. Any menu choices are entirely subject to network operator, programmer, or broadcaster requirements and the following is only intended to illustrate one possible implementation and not to specify the entire range of options that may be provided through this architecture.

1. Channel Assistant Triggered when TV Assistant is on Screen.

Assume for this example that the TV Assistant (which is an information presentation architecture for enabling users of iTV services to access a range of broadcast, on-demand programming and other content) has been manually triggered by the user and is currently on screen. When the user changes channel to a Channel Assistant enabled TV channel, the interface changes to signal the user that broadcaster-specific content is available. The user may choose to view the broadcaster's content by selecting the television station call letters displayed in the on screen menu and, as a result of the selection, the content area changes to display the broadcaster-specific content. In this embodiment, the content layout and functionality mirrors that of the TV Assistant, with content and advertisements specific to the broadcaster. When the user changes off the broadcaster's channel, the on screen display reverts to the TV Assistant.

Figure 2A:
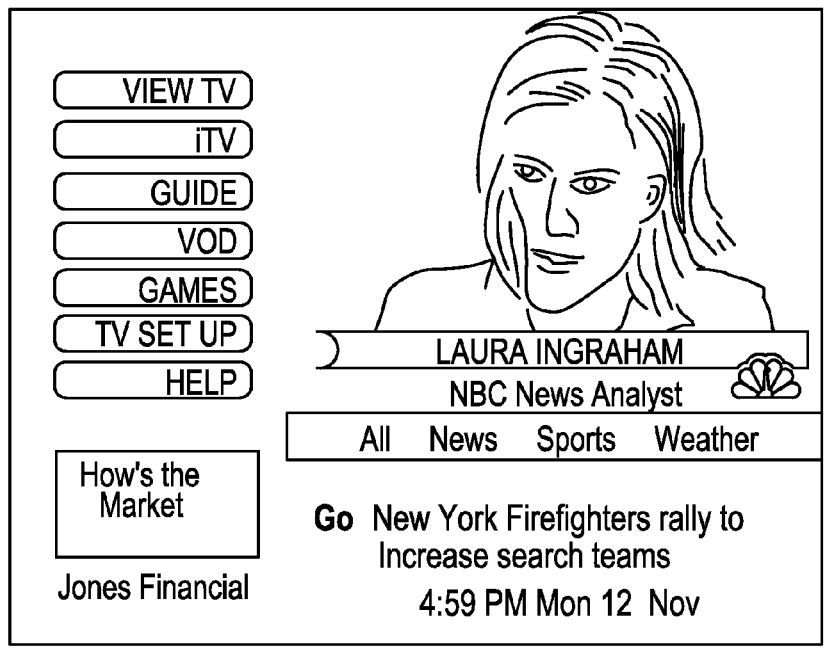
FIGS. 2A-2E illustrate examples of user interfaces configured in accordance with embodiments of the present invention.

The above scenario is illustrated in FIGS. 2A through 2E. FIG. 2A illustrates an example of embedded television content being displayed on a TV set with the TV Assistant screen. The term "embedded" is used to indicate that the entire television program display has been reduced to fit within a television content window of the TV Assistant. Other modes provide for the TV Assistant to simply be overlaid on top of a full screen television content display.

Figure 2B:
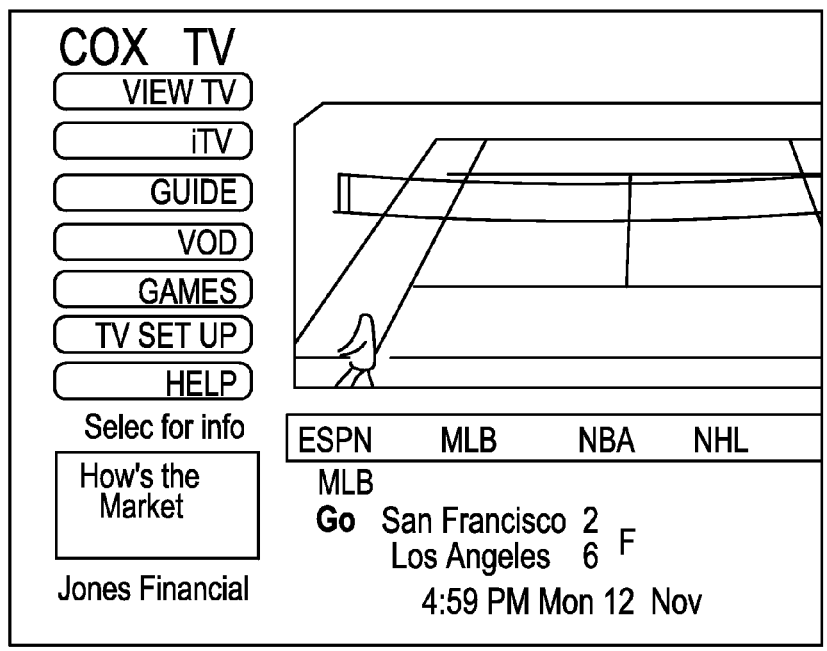

FIG. 2B now illustrates a situation where the viewer has changed channels and is now tuned to the ESPN™ broadcast channel. Recognizing (e.g., via information provided by the Channel Assistant server, that this is a channel for which broadcaster-specific content is available, the Channel Assistant replaces the TV Assistant menu on screen and supplies current ESPN-related, on-demand content to the user interface (in this case the content is sports scores). Further viewer actions are available to navigate through the broadcast channel-related interactive content.

Figure 2C:
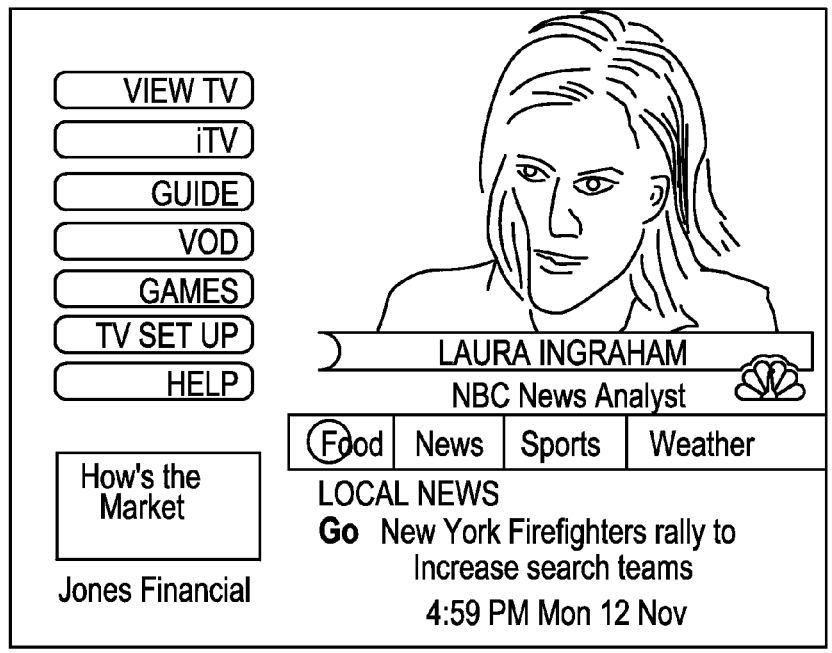

FIG. 2C illustrates a situation where the viewer has tuned from the ESPN channel to the CNBC™ broadcast channel. Again this is a channel for which broadcaster-specific content is available and so the Channel Assistant supplies CNBC-related, on-demand content (in this case food, news, sports, and weather categories) to the user interface. In this example, the Channel Assistant is displayed with an initial screen through which cycles current CNBC interactive news headlines. Further viewer actions are available to navigate through the broadcast channel-related interactive content.

Figure 2D:
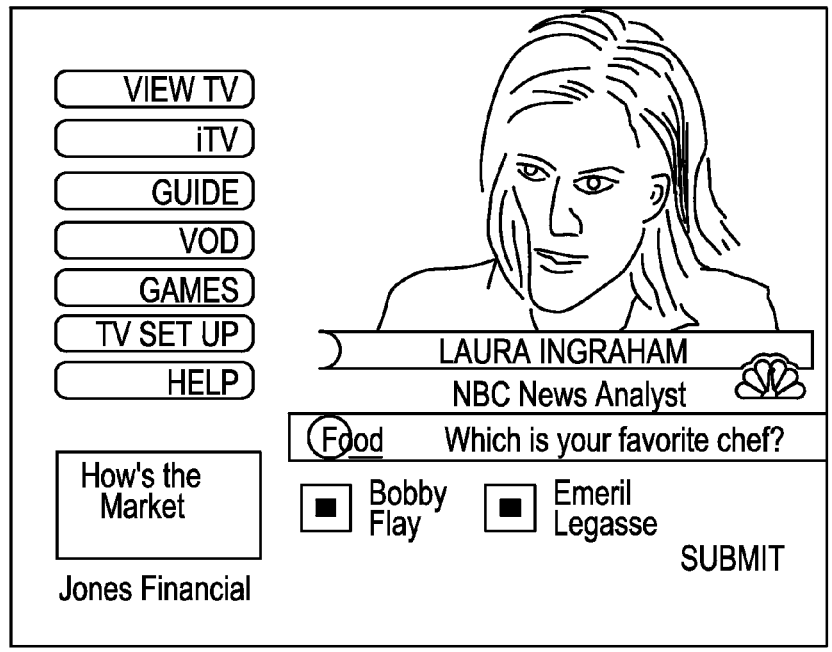
Figure 2E:
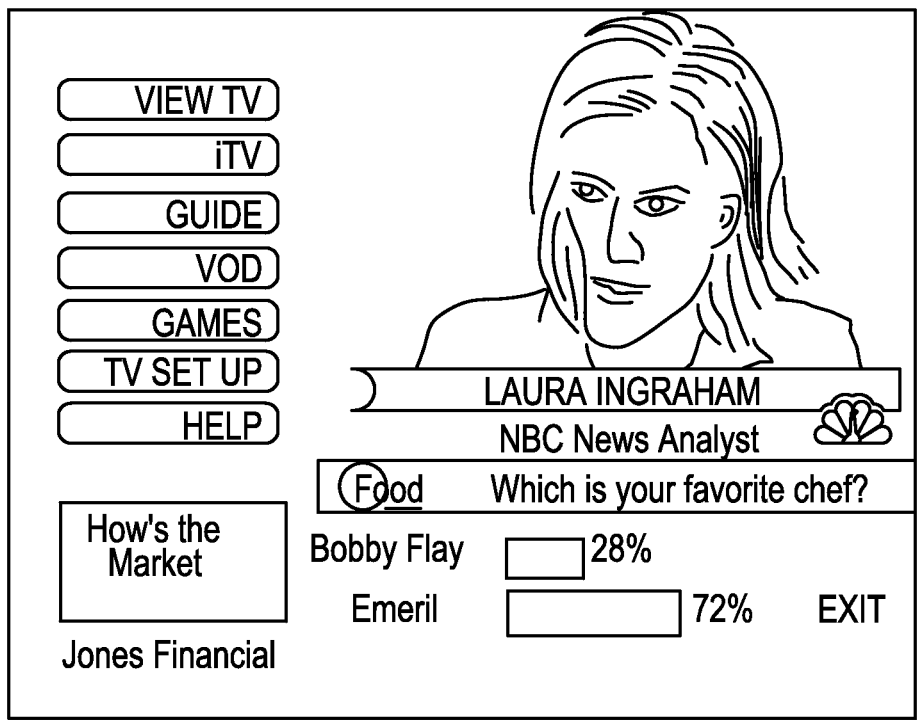

FIG. 2D illustrates a situation where the viewer has selected the Food tile referenced in FIG. 2C. CNBC-related "Food" information is thus displayed to the viewer, in this case an interactive poll seeking information as to the viewer's favorite CNBC chef FIG. 2E illustrates a situation where the viewer is shown the current results of the interactive poll taken over the CNBC audience segment that participated in the "favorite chef" poll.

2. Channel Assistant Triggered by Channel Change.

In this example the Channel Assistant exists in a basic form as an informational overlay with basic information about the current channel (channel number, broadcaster call letters, time, etc). When the user changes channels, Channel Assistant changes to display the current data for that specific channel. When the user changes channels to a Channel Assistant-enabled TV channel, an advanced interface is presented with additional, broadcaster-specific content. In this embodiment, the content layout and functionality is independent of any other application but the interface is consistent between the basic and advanced forms. When the user changes off the broadcaster's channel, Channel Assistant reverts to basic form.

Figure 3:
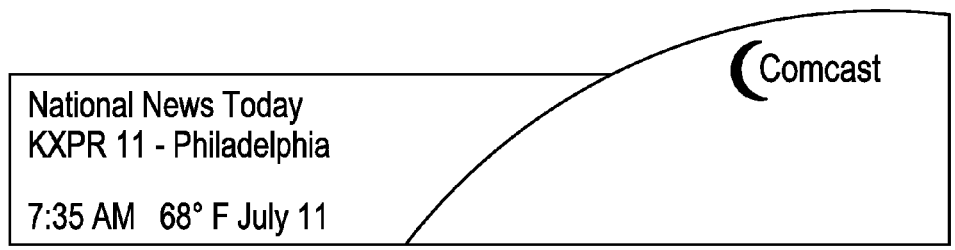
FIG. 3 illustrates an example of a basic user interface configured in accordance with an embodiment of the present invention.
Figure 4:
FIG. 4 illustrates and example of another user interface having tiled content areas configured in accordance with a further embodiment of the present invention.

This embodiment is illustrated in FIGS. 3 and 4. FIG. 3 illustrates a Channel Assistant screen (without the television content) where the current broadcast channel has no interactive services enabled. As shown in FIG. 4, when the viewer changes to a Channel Assistant-enabled channel (for example to NBC channel 10) the interactive content services (NBC Channel 10 News and Weather in this example) associated with that channel are made available to the viewer via the Channel Assistant user interface. In addition, the general network operator on-demand services interface may also be displayed for the user to navigate.

Thus, an improved user interface and user experience for accessing and navigating to iTV content, services and other applications that are related to an iTV channel has been described. The present user interface provides, among other things:

1. methods to dynamically provide multiple entry points to content;
2. methods that break the limitations of existing linear interfaces for channel-related interactive content and services;
3. methods to dynamically illustrate both the breadth and depth of current programming, broadcast or on-demand, channel and associated available on-demand programmer content at the same time;
4. methods to combine live broadcast programming and on-demand content into a single interactive service that provides a subtle transition to the related programming content;
5. methods for presenting time-shifted user interfaces that present different content selections to viewers based on time of day for a given broadcast TV channel;
6. methods for presenting different content selections based on the current broadcast content, to enhance the current broadcast and extend the content bandwidth;
7. formats consisting of groupings of tiles wherein the number of tiles in each screen grouping can be dynamically controlled and the tiles may be selected and the groupings may be individually scrollable using a remote control device;
8. formats wherein the tiled screen groupings can be configured at a prior time and dynamically selected using business rules;
9. formats wherein individual placement and content of tiles within a group can be controlled dynamically using business rules;
10. methods wherein business rules can be based on:
    i. time of day,
    ii. channel,
    iii. current broadcast content,
    iv. current on-demand content,
    v. preferred placement of content,
    vi. viewer demographic,
    vii. viewer behavior,
    viii. navigation context, and
    ix. current content category;
11. methods wherein the content of tiles can be dynamically controlled to include:
    i. channel logos,
    ii. specific program logos or brands, including images, and
    iii. images of people and things.

Although discussed with reference to certain illustrated embodiments, however, the present invention should only be measured in terms of the claims, which now follow.

What is claimed is:

1. A method, comprising:
   responsive to receiving an indication of a user selection of an identifier of a channel or program from a displayed menu:
      populating, by a computing device, a portion of a content guide with interactive content that is related to the channel or program and is configured to collect data based on user input, and
      causing the portion of the content guide populated with the interactive content to be displayed with video of the channel or program.

2. The method of claim 1, wherein causing the portion of the content guide populated with the interactive content to be displayed with the video of the channel or program comprises causing display of the portion of the content guide as an overlay over full-screen programming for the channel or program.

3. The method of claim 1, wherein causing the portion of the content guide populated with the interactive content to be displayed with the video of the channel or program comprises causing the portion of the content guide to be displayed in combination with embedded programming for the channel or program.

4. The method of claim 1, wherein the video of the channel or program comprises at least one of broadcast programming or on-demand programming.

5. The method of claim 1, wherein the interactive content is based on business rules comprising one or more of the following: time of day, channel, current broadcast content, current on-demand content, preferred placement of content, viewer demographic information, viewer behavior, navigation context, or current content category.

6. The method of claim 1, wherein the content guide comprises a grouping of tiles configured to display options within a library of available content.

7. The method of claim 6, wherein the tiles are placed and comprise content based on business rules comprising one or more of the following: time of day, channel, current broadcast content, current on-demand content, preferred placement of content, viewer demographic information, viewer behavior, navigation context, or current content category.

8. The method of claim 7, wherein the content of the grouping of tiles comprises one or more of channel logos, related program logos or brands.

9. The method of claim 1, further comprising:
prior to populating the portion of the content guide with the interactive content and causing the content guide populated with the interactive content to be displayed with video of the channel or program, receiving an indication from a server that the interactive content is available for the channel or program;
receiving, at the computing device, a selection of a second channel or program; and
responsive to receiving the selection of the second channel or program, determining that interactive content related to the second channel or program is not available for the second channel or program and populating the portion of the content guide with a non-interactive textual description of the second channel or program.

10. A method, comprising:
responsive to selection of a first program:
determining, by a computing device, that interactive content related to the first program is available for the first program,
populating a portion of a content guide with the interactive content related to the first program, the interactive content related to the first program being configured to collect data based on user input, and
causing the portion of the content guide populated with the interactive content related to the first program to be displayed with video of the first program; and
responsive to selection of a second program, determining that interactive content related to the second program is not available for the second program and populating the portion of the content guide with a non-interactive textual description of the second program.

11. The method of claim 10, wherein the video of the first program comprises at least one of broadcast programming or on-demand programming.

12. The method of claim 10, wherein the interactive content related to the first program comprises an interactive poll.

13. The method of claim 10, wherein causing the portion of the content guide populated with the interactive content related to the first program to be displayed with the video of the first program comprises causing display of the portion of the content guide as an overlay over full-screen programming for the first program.

14. The method of claim 10, wherein causing the portion of the content guide populated with the interactive content related to the first program to be displayed with the video of the first program comprises causing the portion of the content guide to be displayed in combination with embedded programming for the first program.

15. A method, comprising:
responsive to selection of a program:
determining, by a computing device, that interactive content is available for the program,
populating a portion of a content guide with the interactive content, the interactive content being related to the program and comprising an interactive poll, and
causing the portion of the content guide populated with the interactive content to be displayed with video of the program.

16. The method of claim 15, wherein the video of the program comprises at least one of broadcast programming or on-demand programming.

17. The method of claim 15, wherein causing the portion of the content guide populated with the interactive content to be displayed with the video of the program comprises causing display of the portion of the content guide as an overlay over full-screen programming for the program.

* * * * *